Sept. 16, 1958  C. G. KAEHMS  2,852,707
COUPLING LIQUID MECHANISM FOR ULTRASONIC VIBRATIONS
Filed Aug. 1, 1955  3 Sheets-Sheet 1
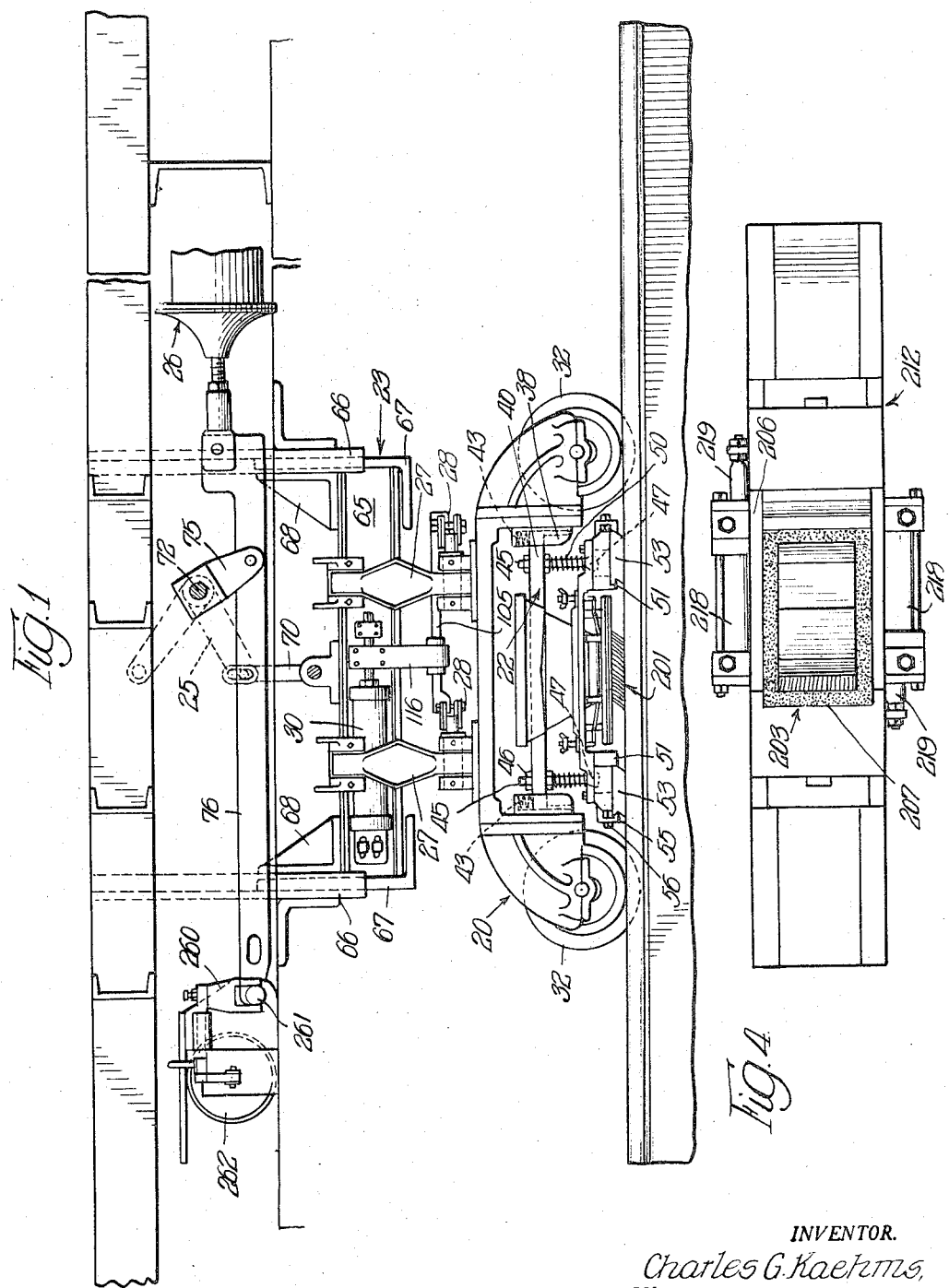
INVENTOR.
Charles G. Kaehms,
BY
Mann, Brown and Hansmann
Attys

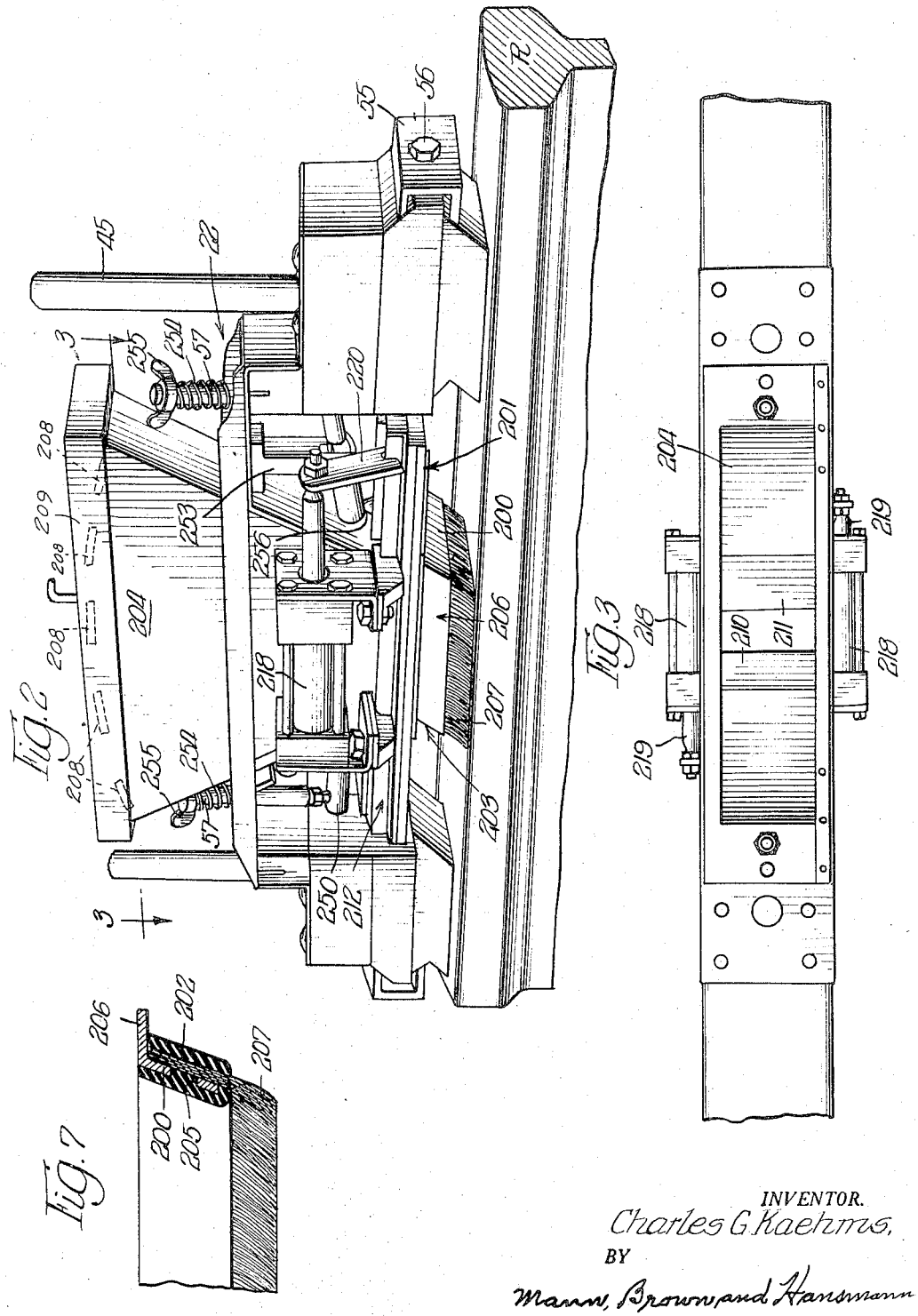

Sept. 16, 1958  C. G. KAEHMS  2,852,707
COUPLING LIQUID MECHANISM FOR ULTRASONIC VIBRATIONS
Filed Aug. 1, 1955  3 Sheets-Sheet 3
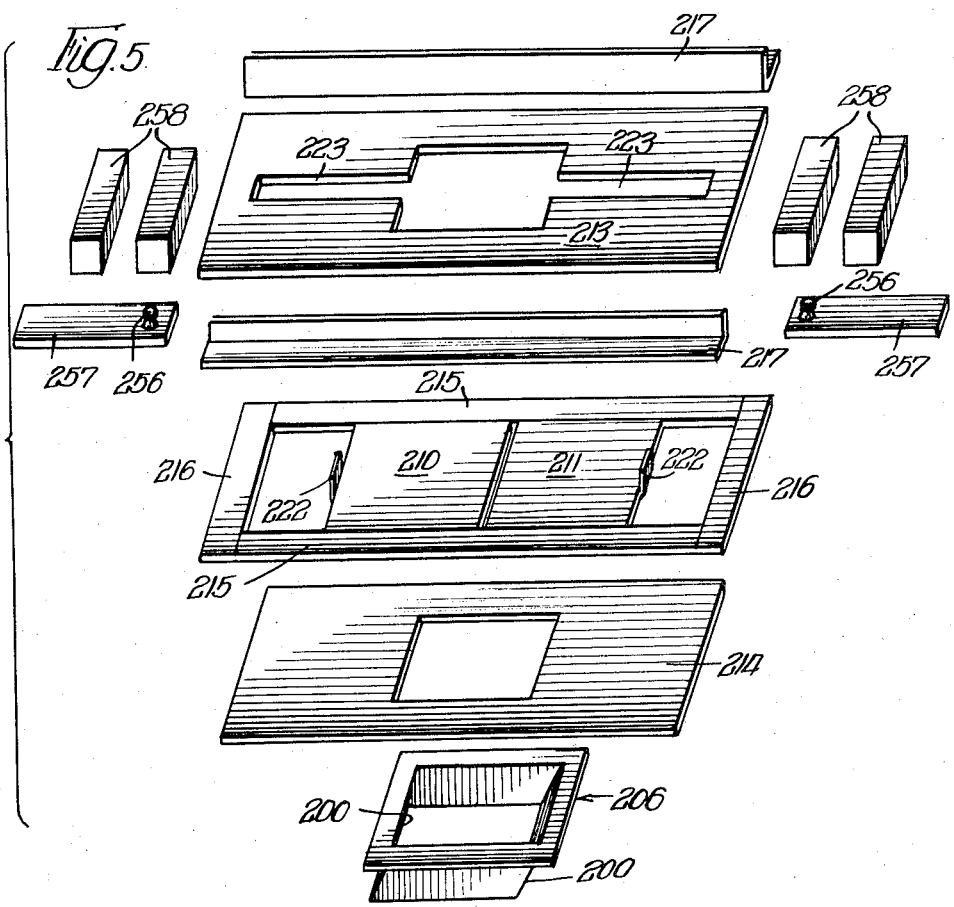
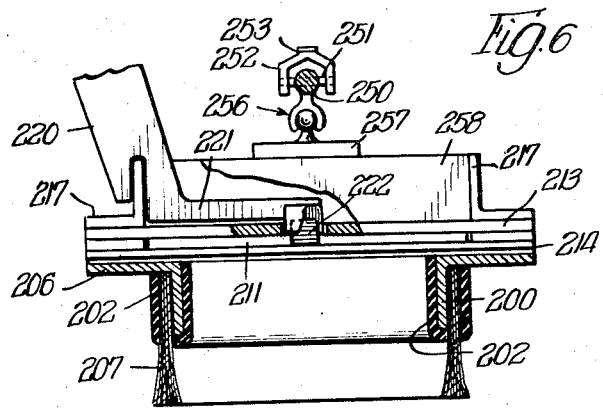
INVENTOR.
Charles G. Kaehms,
BY
Mann, Brown and Hansmann
Attys.

United States Patent Office 2,852,707
Patented Sept. 16, 1958

2,852,707

COUPLING LIQUID MECHANISM FOR ULTRASONIC VIBRATIONS

Charles Gustav Kaehms, Oakland, Calif., assignor to Southern Pacific Company, San Francisco, Calif., a corporation of Delaware Application August 1, 1955, Serial No. 525,652

4 Claims. (Cl. 310—8.1)

This invention relates to a device for testing solid bodies with elastic vibrations and more particularly is concerned with a liquid coupling mechanism for the progressive testing of successive rail portions by means of ultrasonic vibrations.

Ultrasonic vibrations may be produced by a piezoelectric quartz crystal actuated by a suitable electrical signal but it is frequently difficult to secure adequate coupling between the crystal and the body under test. For example, the presence of a gas or gas film between the two parts tends to block transmission of the vibrations and this blocking action is even more pronounced for the higher frequency vibrations.

To establish adequate coupling between a crystal and the body under test, a thin film of oil or grease has been employed therebetween. However, in testing rail with a detector car traveling between a speed of five to eight miles per hour, the pressing of a quartz crystal in such close contact with the rail surface is unsatisfactory and frequently results in damaging these rather expensive crystals. In addition, the contour of the rail surface is somewhat irregular in many instances, and it is difficult to maintain proper contact.

In an attempt to avoid the difficulties outlined above, water has found application as a conductor for ultrasonic vibrations. In certain testing arrangements, both the quartz crystal and the body under test are immersed in a water filled tank. In other applications wherein there is relative movement between the two parts, a stream of running water is maintained between the crystal and the surface of the body under test. In either case, the use of water makes it possible to eliminate the necessity for bringing the quartz crystal into contact with the surfaces of the body in order to transmit the ultrasonic vibrations therebetween.

The use of a stream of running water in connection with a rail test car requires that an extremely large amount of water be carried on the car and hence involves serious practical limitations. Oftentimes, it is not possible to test all of the trackage between adjacent sources of water supply, and in any event, the testing procedure is needlessly encumbered. In other applications wherein the parts undergo relative movement, it is frequently necessary to take elaborate precautions in order to prevent the stream of water from contaminating surrounding equipment and installations.

The present invention has for its principal object the provision of a device for establishing and maintaining an adequate coupling between an ultrasonic transducer and a solid body that eliminates the above difficulties.

Another object is to provide such a device that is particularly adapted to the testing of rail by means of a detector car.

A further object is to provide such a device that utilizes water or some such similar liquid as the couplant and that minimizes the amount of leakage.

Other objects and advantages of the invention will become apparent as the description proceeds.

In the accompanying drawings, forming a part of this specification and in which like numerals are employed to designate like parts throughout the same, Fig. 1 is a side elevation of a coupling mechanism mounted on a detector car as contemplated in the preferred practice of the elevation;

Fig. 2 is a perspective view of the coupling mechanism illustrating the arrangement of its supporting subcarriage;

Fig. 3 is a top plan view taken on the line 3—3 of Fig. 2;

Fig. 4 is an inverted plan view, taken looking upward at the brush from the rail surface;

Fig. 5 is an exploded perspective view of the brush and slide valve;

Fig. 6 is an end elevational view of the brush mounting and slide valve arrangement with parts broken away and sectioned; and Fig. 7 is an enlarged fragmentary view of the brush itself.

Referring now to the drawings and particularly to Fig. 1, there is shown the novel liquid coupling mechanism associated with a carriage and carriage suspension and control apparatus and a rail test car of the general type that is illustrated in my United States Patent No. 2,461,984 entitled "Flaw Detector Mounting and Control." The pertinent portions of my said prior patent insofar as they are not inconsistent are specifically incorporated herein by reference.

Briefly, the liquid couplant mechanism includes a brush rail contact assembly that is adapted to progress a sonic column of liquid couplant along a rail with but a minimum of liquid loss. This assembly may be mounted on a rail test car for movement therewith and comprises a water reservoir that supplies water to the rail surface, and a brush mechanism that is secured to surround the outlet opening of the reservoir and consists of a plurality of bristles arranged in closely spaced relationship to form a closed loop that confines the water for contact with the rail and progresses it along the surface of the rail without loss. Means are provided for mounting the crystal within the reservoir for contact with the liquid couplant and for this reason it is important that the liquid level in the reservoir be maintained at the elevation of the crystals.

It is contemplated that the liquid couplant mechanism may be used with any form of ultrasonic testing system and specifically this includes resonance testing systems, pulse-echo testing systems, and frequency modulated testing systems.

The principal parts of the illustrated structure are a main carriage, generally designated 20, and a subcarriage, generally designated 22, that is mounted on the main carriage for supporting the liquid couplant mechanism generally designated as 201. The main carriage is supported on the rail by forward and rearward flanged wheels 32 and is adapted to be raised from the rail when the test car runs light in between testing operations. The carriage rides on the rail with the wheel flanges urged against the gauge edge of the rail as by means of suitable springs (not shown) in order to properly align the liquid couplant mechanism 201, that is carried above the rail by the subcarriage 22.

The liquid coupling mechanism is shown in detail in Figs. 2 to 7 and consists of a brush assembly 203 secured around the bottom edges of a water trough or reservoir 204 with an air cylinder operated stainless steel slide valve interposed therebetween.

The brush assembly itself consists of a 1/16 inch thick metal or plastic frame 206 having a rectangular opening therethrough approximately 2½ inches wide and 3 inches long. The size of the opening corresponds to the outlet opening in the liquid reservoir 204. The rectangular opening is entirely surrounded with nylon bristles 207 which preferably are approximately .007 to .012 inch in diameter and are fitted into all four sides of the frame in closely spaced relationship to a thickness of approximately ¼ inch. Actually .009 inch diameter bristles have been found to pack closer, retain water better, and be more resilient. The overall height of the frame and the bristles is approximately 1 inch. The bristles are arranged in the frame at an angle of 60 degrees with the rail surface, as measured in the direction of travel and to facilitate this arrangement the depending end walls 206 of the frame are tilted at an angle of 60 degrees.

It should be apparent that the bristles are thus readily capable of responding to pressures applied to the brush so that when the brush is in motion and is subjected to suitable downward pressure, the bristles will always follow the changing contour of the rail.

In order to achieve an optimum confining action, a specific form of brush is provided as shown in Fig. 7. In securing the bristles 207 around the frame 206 it is preferred to invert the frame and mount it between suitable mold members that are arranged to provide an endless groove. The bristles may then be located within the grooves and a plastic binder 202 is introduced to secure them in place. Preferably the depending frame portions are apertured, as at 205, to permit the plastic to flow completely therearound and encase the side surfaces thereof.

It is preferred to employ nylon bristles for their long wearing qualities and the bristles may be coated with a suitable water repellant to further enhance their liquid confining action.

The water reservoir may be of any desired shape but is illustrated as being rectangular in plan sectional view and tapers inwardly from top to bottom. Facilities are provided for mounting one or more quartz crystals 208 or other suitable supersonic transducers in coupling contact with the water supply, and since the water is in direct contact with the rail surface, the present arrangement provides a liquid sonic column that may be progressed along the rail under the confining action of the brush bristles.

As shown, the crystals 208 are disposed within suitable pockets provided in a Bakelite head 209 that is mounted on the water reservoir for closing the top thereof and it is absolutely necessary that the water level be equal to or above the crystal level. Any suitable supply system for maintaining this water level may be employed but for simplifying this disclosure, no specific system is shown. The lower surface of the Bakelite head is curved for accommodating each of the crystals 208 in a different plane and this arrangement permits detection of a variety of defects irrespective of their orientation.

A pair of air cylinder operated stainless steel slide valve plates 210 and 211 are provided for sealing the outlet of the water reservoir.

These slide valve plates are mounted in a supporting frame 212, see Figs. 2, 3, and 4, in liquid tight sliding relationship and are arranged across the bottom opening of the water reservoir 204 for relative opening and closing movement for establishing and interrupting communication between the reservoir and the brush.

The supporting frame, as best shown in Fig. 5, consists of upper and lower plates, 213 and 214, respectively, having rectangular openings generally corresponding in size to the outlet opening of the reservoir. Between the plates 213 and 214 is disposed a rectangular frame consisting of side pieces 215 and end pieces 216, within which the plates 210 and 211 are mounted for relative sliding movement. The plates 213 and 214 and the frame pieces are secured together in liquid tight relationship by suitable nuts and bolts and this arrangement has satisfactorily provided the desired sealing.

The lower end of the water reservoir 204 is adapted to rest snugly in the rectangular opening in the upper plate 213. The water trough is actually supported by the suspension rods 57 but for the purpose of guiding and positioning the trough, it is also disposed within suitable openings formed in the beam 40 and subcarriage 22. The brush assembly, itself, is also provided with a peripheral flange adapted for connection to the lower plate 214 by suitable screws.

While the nylon bristles are long wearing, they ultimately are consumed by frequent usage or may become damaged during use and therefore for facilitating repair it is preferred to mount the brush assembly for ready removal and replacement.

Suitable angle iron members 217 are secured along the upper plate 213 in spaced apart parallel relationship and serve as convenient mounting facilities for a pair of opposed air operated cylinders 218. These cylinders are provided with suitable operating rods 219 that carry actuating members 220 for the slide valves. Each actuating member is forked and straddles the upstanding arm of the associated angle iron and this arrangement effectively guides the reciprocating travel of the actuating members.

For engaging the slide valves, the inner arm of each of the forked actuating members 220 includes an integral inward projection 221 adapted to straddle an upwardly extending tab 222 provided at the opposite end of each slide valve and the upper plate 213 has a suitable elongated slot 223 to accommodate this movable connection.

The air cylinders 218 are spring biased to a position that maintains the slide valves closed and are adapted upon application of compressed air to force the slide valves to open position. These cylinders are preferably connected into the general control system disclosed in my said prior patent for operation to terminate communication, between the reservoir and the brush prior to lifting of the main carriage above the rail and to establish communication immediately after lowering the main carriage into contact with the rail. The total water loss, therefore, is the water contained within the brush proper when the slide valve is closed and the assembly is lifted away from the rail plus the water which adheres to the rail surface plus the water loss at the rail ends. It should be appreciated that this total amount is negligible when compared with the amount of water required in order to provide a stream of running water.

For successful operation it is imperative that the pressure applied to the brush assembly be uniform at all times in order that the brush make good contact with the surface of the rail head. In addition, it is important that the brush assembly be fastened to and guided over the rail by a structurally rigid carriage. For the purpose of mounting and guiding the subcarriage 22 for the liquid couplant mechanism, the main carriage 20 is provided with a pair of vertical guides 38 channel shaped in cross section in which are mounted the opposite ends of a longitudinal guide beam 40 for limited relative vertical sliding movement. Preferably, suitable springs 43 are enclosed in the vertical guides 38 to press downward on the ends of the guide beam 40. Two threaded suspension rods 45 are adjustably but rigidly mounted on the guide beam 40 by means of suitable nuts 46 and are formed with ball members 47 on their lower ends.

The subcarriage 22 is suspended from the main carriage by suitable sockets that cooperates with the ball members 47. Suitable helical springs 50 surrounding the suspension rods 45 and acting between the guide beam 40 and the detector carriage serve to maintain the ball members 47 in their sockets, these springs being stronger than the springs 43 acting on the ends of the guide beam. At the opposite ends of the subcarriage, suitable blocks 51 are mounted thereon and suitable shoes 53 are replaceably mounted on the blocks 51 in a well-known manner by clamps 55 and bolts 56. This structure is generally similar to that shown in my aforementioned patent and identical reference characters have been employed.

It should be apparent that in the described arrangement for mounting the subcarriage 22 on the main carriage 20, the springs 50 permit the subcarriage to rock in a vertical longitudinal plane to follow irregularities in the configuration of the rail R and the ball joint suspension permits the subcarriage to swing for the same purpose on a longitudinal axis determined by the two ball members 47 and their cooperating sockets.

The liquid couplant mechanism 201 is suspended from the subcarriage 22 by means of axially movable suspension rods 57 (see Figs. 2 and 6) that extend through the arched portion of the subcarriage 22 for pivotal connection to one end of a push down lever 250 that carries a transverse pin 251 rotatably mounted in the trunnion 252 formed at the lower end of a bracket 253 that is rigidly secured to the subcarriage.

It should be noted that the water reservoir 204 rides freely within the subcarriage 22 and its weight is imposed directly on the brush bristles. At their upper ends the suspension rods 57 are provided with a telescoping spring 254 that seats against the upper surface of the subcarriage and are threaded to receive a nut 255 for confining the spring. The threaded connection permits the nut 255 to be adjusted for varying the degree of compression of the spring 254.

The opposite ends of the push down levers 250 are adapted to apply downward pressure to the supporting frame and for this purpose are connected thereto by suitable ball and socket joints 256.

Each of the joints 256 is carried on a cross bar 257, the opposite ends of which rest upon suitable spacer blocks 258 that are secured to the upper plate 213 in spaced apart relationship. The spacer blocks provide the necessary clearance between the cross bars 257 and the movable tabs 222. Thus the force of the springs 254 urges the suspension rods 57 upwardly to apply pressure to the liquid couplant mechanism for maintaining suitable pressure on the brush bristles and this pressure may be varied as desired by adjusting the positioning of the nuts 255.

The arrangement for suspending the liquid coupling mechanism from the subcarriage is similar to the suspension system of the subcarriage and main carriage in that the springs 254 permit the liquid coupling mechanism to rock in a vertical longitudinal plane to follow irregularities in the configuration of the rail R and the ball joints 256 permit swinging for the same purpose on a longitudinal axis.

It is desirable that the main carriage be capable of lateral and vertical movement relative to the test car itself. In addition, the carriage should be provided with a mounting that will maintain the brush assembly at the desired upright position relative to the top surface of the rail regardless of the degree of extension of the brush assembly vertically or laterally and regardless of the tilt of the car. A further requirement of the carriage is that it be provided with a control arrangement that will cause the carriage mounting means to operate in a predetermined cycle involving both downward extension and lateral extension from a retracted position, and it is preferred that such a cyclic control be provided with a single reversible manual control. Further, it is important that the carriage automatically correlate the vertical and lateral components of movement of the brush assembly, and it is desirable that an efficient electrical system be utilized in controlling and correlating the different movements involved.

All of the above mentioned features are exhibited in the carriage shown in my prior Patent No. 2,461,984 and the general means for accomplishing this form of operation is disclosed hereinafter in order to lend continuity to the present disclosure. However, if a detailed description is desired, reference should be had to my aforementioned patent.

The main carriage is suspended from a vertically movable support 23 by means of forward and rearward parallel links 27. The vertically movable support is here shown in the form of a horizontally extending I-beam 65 adapted for sliding movement relative to the vertical guides 66. The guides 66 may be channel members rigidly mounted on the under structure of the detector car and each end of the I-beam 65 is provided with a shoe 67 that slides in the channel-like guides and the second shoe 68 that slides against the inner face of the guide. The beam 65 is pivotally connected to a lift link 70 which in turn is pivotally connected to a lift arm 25. The lift arm 25 is mounted on and operated by a shaft 72 that is journalled in suitable bearings on the under frame of the detector car. The shaft 72 in turn is controlled by a rocker arm 75 that is pivotally connected to a horizontally reciprocable bar 76. At one end the bar 76 is connected to a horizontally disposed lift cylinder 26 that may be actuated by compressed air or any other suitable medium. Preferably, the bar 76 is provided at its other end with an electric lock to maintain the main carriage in its raised position.

The provision of the lock is solely to provide an additional factor of safety and it is preferred to furnish a separate control circuit (not shown) for actuating this lock. The lock consists of a bifurcated arm 260 that straddles a projection 261 carried at the extremity of bar 76 and the arm 260 is fixed against longitudinal movement on the car frame. Release of the lock is accomplished by a solenoid actuated air cylinder 262 that is adapted to shift the arm 260 laterally with respect to the car frame. The control switch and supply circuit for actuating the air cylinder 262 may be conventional.

Each of the previously mentioned sets of parallel links 27 is capable of lateral pivotal movement and that is produced by suitably actuating sets of expandable scissor like links 28. These links are suitably connected to the I-beams 65 and are connected to a rod 105 that is adapted to be reciprocated by an air operated cylinder 30 that is suitably spring biased. Due to the complexity of the arrangement, the connection between the links 28 and the I-beam 65 is omitted but it should nevertheless be clear that the cylinder 30, through a connecting link 116 reciprocates the rod 105 to cause expansion and contraction of the scissors links 28. These links in turn cause lateral pivoting movement of the links 27 and thereby produce lateral movement of the main carriage 20.

The electric and hydraulic system for the carriage actuating elements may be substantially similar to the circuit shown in Fig. 1 of my said prior patent, however, in the present arrangement there is no requirement for the push-down cylinders shown at 140 in said Fig. 1 but there is a requirement for air-operated cylinders 218 for controlling the slide valves. It can be shown that the operating sequence for this control system when utilizing air-operated cylinders 218 for controlling the slide valves in the circuit positions occupied by the push down cylinders 140 exactly satisfies the conditions that the slide valves remain closed until the coupling mechanism is properly centered on the rail and that the slide valves reclose immediately before the coupling mechanism is raised from the rail.

The objects of the present invention have been accomplished in that the disclosed mechanism includes an endless loop of bristles that permits a sonic column of liquid couplant to be progressed along a rail for facilitating the transmission and reception of elastic vibrations produced by a transducer or other body. In addition, the mechanism allows but a minimum of couplant loss. Finally, the coupling mechanism is readily mounted on a detector car and may be carried by carriage mounting and control arrangements of proven utility.

It should be understood that the description of the preferred form of the invention is for the purpose of complying with Section 112, Title 35 of the United States Code, and that the appended claims should be construed as broadly as the prior art will permit.

I claim:

1. In an ultrasonic testing system wherein a detector car carries ultrasonic equipment that includes an elastic wave-emitting element for continuously progressing said element along longitudinally successive portions of a track rail, a liquid sonic column-forming container carrying said element at the upper end thereof, said container having an outlet at the bottom end thereof opening toward said rail, a liquid-retaining pack in the form of a unitary closed loop of closely spaced, normally straight, parallel extending bristles of resiliently flexible material, means supporting said pack with said loop of bristles surrounding said outlet and projecting therebeyond with said bristles being directed at an oblique angle relative to the surface of said rail within said closed loop to confine a liquid sonic column in open communication therewith, and carriage means suspended from said car and including means for supporting said element in spaced-apart facing relation toward the surface of said rail within said closed loop, and means yieldingly biasing said closed loop toward said rail.

2. The arrangement of claim 1 wherein said bristles are of a nylon-like material.

3. The arrangement of claim 1 wherein said loop of bristles is anchored on an open centered attachment frame in surrounding relation with the opening therein, and releasable fasteners fixing said frame to said container with the frame opening in registry with said outlet.

4. The arrangement of claim 1 wherein said loop of bristles is anchored on an open centered attachment frame in surrounding relation with the opening therein, a supporting frame is mounted in telescoping relation about said outlet and carries a pair of cooperating slide plates in movable sealing engagement across said outlet for slidable relative opening and closing movement, and releasable fasteners fix said attachment frame to said supporting frame with said attachment frame opening in registry with said outlet.

References Cited in the file of this patent

UNITED STATES PATENTS

| | | |
|---|---|---|
| 2,461,984 | Kaehms | Feb. 15, 1949 |
| 2,532,507 | Meunier | Dec. 5, 1950 |
| 2,666,862 | Branson | Jan. 19, 1954 |

FOREIGN PATENTS

| | | |
|---|---|---|
| 837,278 | Germany | Aug. 20, 1953 |